Aug. 10, 1954         P. TERZI         2,685,933
VARIABLE PITCH PROPELLER
Filed Jan. 28, 1952         4 Sheets-Sheet 4
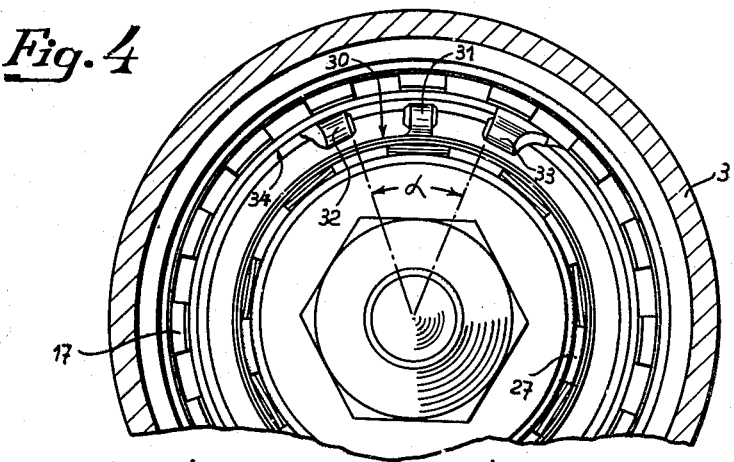
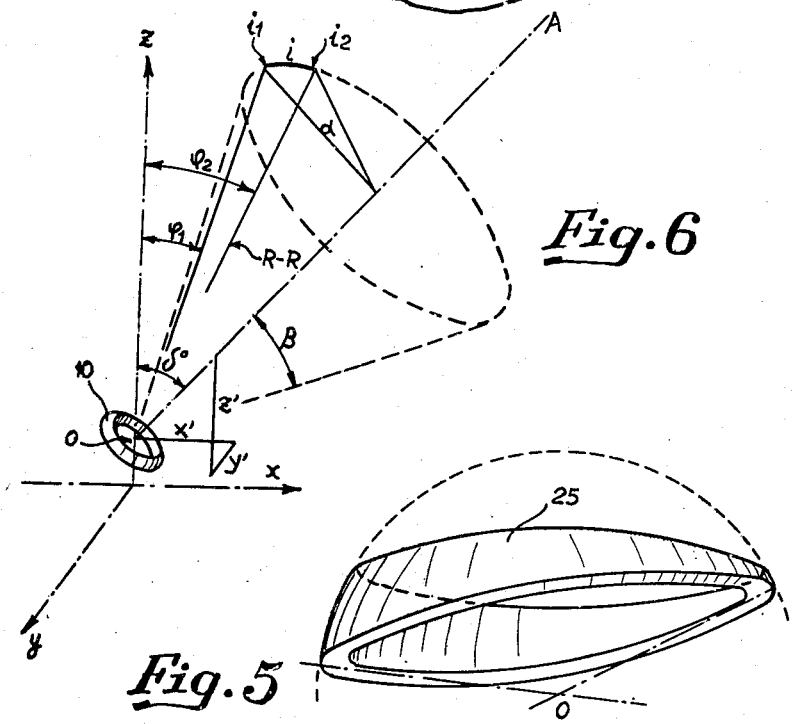
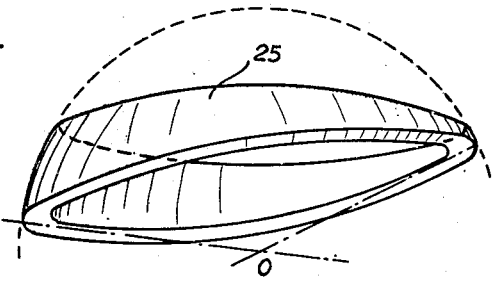
INVENTOR
PAOLO TERZI
BY Robert Burns
ATTORNEY Patented Aug. 10, 1954

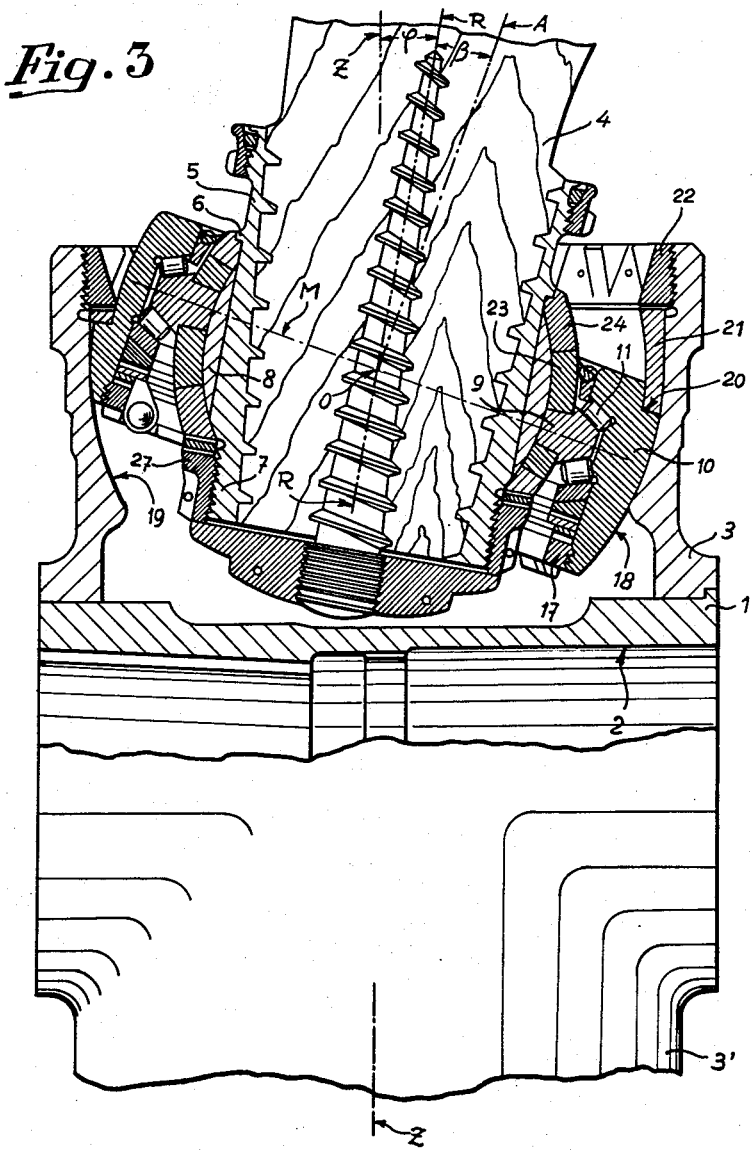

2,685,933

UNITED STATES PATENT OFFICE 2,685,933

VARIABLE PITCH PROPELLER

Paolo Terzi, Milan, Italy

Application January 28, 1952, Serial No. 268,645

Claims priority, application Italy February 1, 1951

6 Claims. (Cl. 170—160.57)

1

This invention relates to rotary blades of any type, such as airscrews, marine propellers, rotors for helicopters, rotors for compressors and pumps, windmills and, broadly, any bladed rotating members submitted to centrifugal force and to the axial thrust within a fluid in relative movement, and concerns more particularly the connection of the individual blades with their associated hub.

A first object of this invention is to provide a propeller of automatically variable pitch in accordance with its operating conditions.

A further object of this invention is to provide one type of connection between the blade and propeller hub, suitable for all propellers and, more particularly, to almost all types of aircraft, but for the necessary modification of a purely technological character depending upon the powers involved.

A further object of this invention is to provide in said propeller adjusting members which permit of determining experimentally the most satisfactory arrangement of the blade for the latter to be self-controlled under all operating conditions.

A further object of this invention is to provide a variable pitch propeller simple in construction through the use of a minimised number of component parts, so as to almost fully eliminate the necessity of overhauling once assembly and setting have been effected.

With these objects in view, I provide in an automatic pitch changing propeller a hub, a radial sleeve on said hub, a bearing mounted within said sleeve, a propeller blade freely rotatable within said bearing, means positioned between said bearing and sleeve for varying the position of the axis of said bearing with respect to the axis of said sleeve, and means positioned between said bearing and the blade for varying the position of the axis of said blade with respect to the axis of said bearing.

According to a further feature of this invention, in an automatic pitch changing propeller I provide a hub, a radial sleeve on said hub, a bearing mounted within said sleeve, a propeller blade freely rotatable within said bearing through a predetermined angle about the axis of said bearing, means positioned between said bearing and sleeve for varying the position of the axis of said bearing with respect to the axis of said sleeve, and means positioned between said bearing and the blade for varying the position of the axis of said blade with respect to the axis of said bearing.

2

Further features and advantages of this invention shall be understood from the following description of a preferred embodiment thereof, reference being made to the accompanying drawings, in which:

Figure 3 is a section identical with that of Figure 1, the bearing and blade being adjusted in a different manner;

Figure 4 is a section on line IV—IV of Figure 1;

Figure 5 is a perspective view of a spherical ring;

Figure 6 is an explanatory diagram showing the angular relations between the axes of the main members forming the propeller according to this invention.

Figure 1:
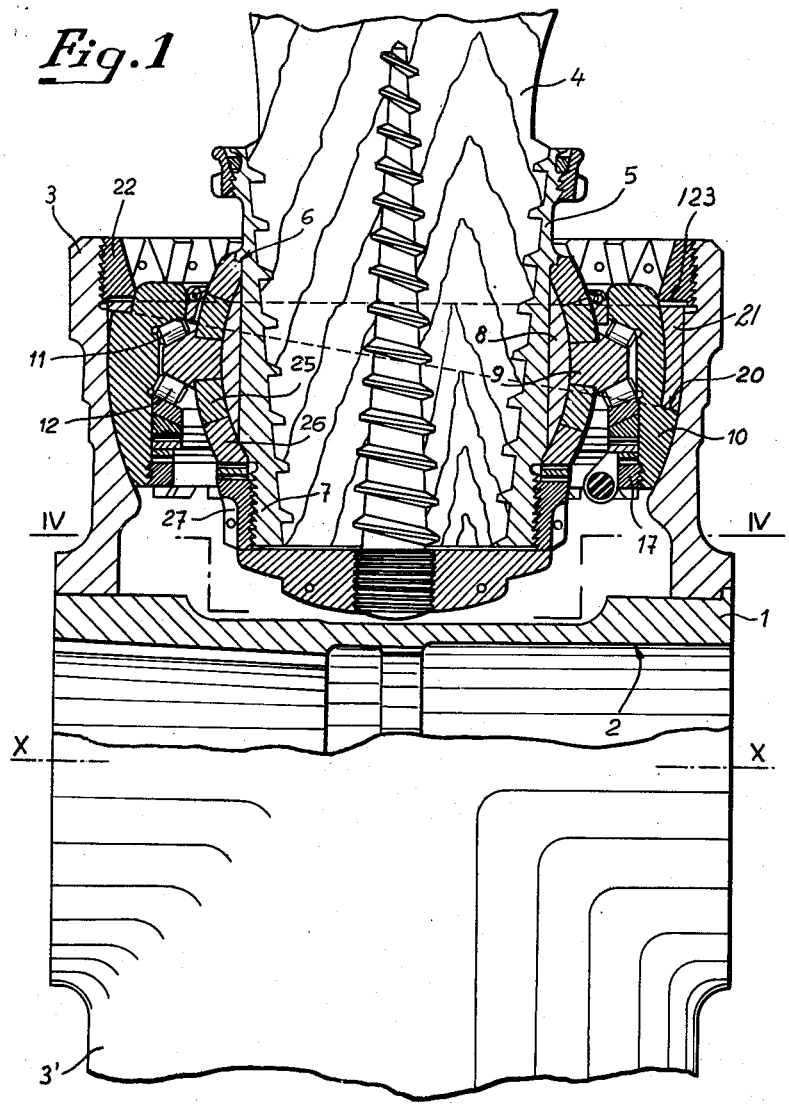
Figure 1 is a section on a plane common to the hub axis and sleeve axis of a two-bladed aircraft propeller according to this invention.

In Figures 1 to 5, 1 denotes the propeller hub according to this invention, adapted to be keyed to an engine shaft, not shown, reaching within the axial bore 2 in the hub. Assuming the said propeller has two blades only, the hub is provided with two radial sleeves 3, 3', respectively, diametrically opposed with respect to the geometric axis X—X of the hub, having consequently a common axis Z—Z (Figure 2) perpendicular to the axis X—X.

4 denotes the root of a blade screwed in a socket 5. Though the blade is shown as a wooden blade, it will be obvious that the blade material is not essential for the purpose of this invention.

The socket 5 is formed externally with a shoulder 6 and a screw-threaded end portion 7. A spherical seating 8 is fitted on the socket portion between the shoulder 6 and the end portion 7 and has fitted thereon the inner race ring 9 of an antifriction bearing comprising moreover an outer race ring 10 and two rows of conical rollers 11, 12, respectively. As will be seen from the drawing, the arrangement is such that the bearing 9—12 can take up not only radial forces but also axial thrusts in both directions. In fact, the race ring 9 is formed with two inclined raceways 13, 14 and the race ring 10 is similarly provided with a rolling track 15 directly formed therein and a separately attached rolling track 16 which is secured to the race ring 10 by means of a screw-threaded annular member 17 through the interposition of some annular members, of which the function shall be explained hereafter.

The outer race ring 10 is formed with a spherical external profile 18, concentrical with the spherical seating 8 and is arranged within a spherical seating 19 formed within the sleeve 3 (Figure 3). The seatings 8 and 19 are therefore concentrical and the axis of the bearing 9—12 can take with respect to the axis of the sleeve 3 an infinite number of positions depending upon the position of the outer race ring 10 in the seat 19.

The race ring 10 is further provided externally with a peripheral shoulder 20 which is contained in a plane inclined with respect to the axis of the bearing and is engaged by the lower face of a substantially spherical annular element 21. The element 21 has oblique faces so that, while its lower face engaging the shoulder 20 is inclined with respect to the geometrical axis Z—Z of the sleeve 3, its upper face is constantly perpendicular to said axis.

22 denotes a screw-threaded annular member screwed in the sleeve 3 and pressing through the interposition of a washer 123 the annular element 21 against the shoulder 20. It will be obvious that, on unscrewing the member 22, the member 21 and the inner race ring 10 of the antifriction bearing 9—12 may be rotated, whereby the geometrical axis of the bearing takes various positions with respect to that of the sleeve 3. The bearing may be retained in the selected position by screwing the screw-threaded annular member 22.

The position of the inner race ring 9 can be similarly adjusted on the spherical seating 8, that is, the position of the blade axis may be adjusted with respect to the bearing axis. Two spherical rings 23 and 24 having oblique faces are interposed between the race ring 9 and shoulder 6, said rings being similar to the member 21, of the type shown in detail in Figure 5, in which the mutual inclination of the faces is well visible. Two further spherical rings 25, 26 are arranged between the race ring 9 and a nut 27 screwed on the screw-threaded portion 7 of the socket 5. On slackening the nut 27 and rotating by pairs between them the rings 23, 24 and the rings 25, 26, respectively, the position of the blade axis may be varied with respect to that of the bearing 9—12 within the limits depending upon the inclination of the faces of the rings 23—26.

Figure 2:
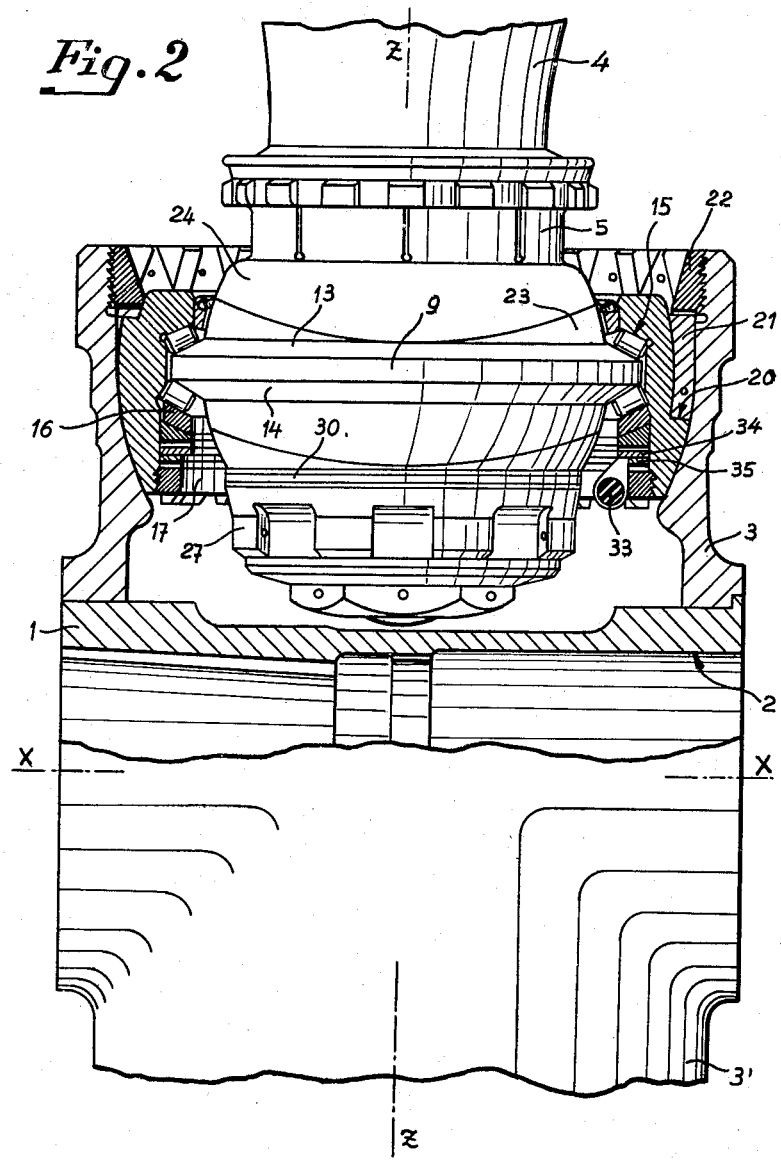
Figure 2 is a section identical with that of Figure 1, some parts being shown in side view.

In Figures 1 and 2, the arrangement of the annular elements adjusting the position of the bearing on the seats 8 and 19 is such that the axis of the sleeve 3 coincides with the axis of the bearing and the blade axis. In Figure 3 the member 21 has been rotated through 180° about the axis Z—Z of the sleeve 3, so that the bearing axis forms to the axis Z—Z in the plane of the drawing the maximum angle admissible for the construction shown. This angle might be transferred to another plane containing the axis Z—Z by rotating together the rings 21 and 10. In the same Figure 3 the rings 23, 24 and 25, 26 have been rotated about the blade axis through a relative angle smaller than 180°, so that the blade axis is deflected from the bearing axis by an intermediate angle between 0° and the maximum angle occurring if the rings in each pair were relatively rotated through 180°.

More particularly, on slackening the nut 27, the blade and socket 5 can be rotated with respect to the rings 9 and 23—26 as a whole in order to locate the most convenient position.

In Figure 3, O denotes the centre of the bearing (coinciding with the common center of the spherical seats 8, 19), R—R is the blade axis, M is the plane of the bearing and O—A is the axis of the bearing. In the drawing the axes R—R and O—A have been drawn in the same plane as the axis Z—Z of the sleeve 3 for the sake of convenience, but these three axes are in general actually distributed in the space and not in a plane, as will be explained hereafter.

The blade 4 rotates with the race ring 9 of the bearing 9—12 about the axis O—A describing a cone of an aperture $2\beta$, in which $\beta$ is the angle, adjusted by means of the rings 23-26, between the axis O—A and the axis R—R. At the same time the axis R—R of the blade forms to the axis Z—Z an angle $\varphi$, which is obviously variable on rotation of the blade in the bearing in which the blade describes the above-mentioned cone.

It will be understood from the foregoing that the bearing 9—12 is the so-called "delta-hinge," of the which the axis is the axis O—A of the bearing. As distinct from known constructions, however, in the propeller according to this invention the position of this axis is no longer determined by the tedious calculations implying a full qualitative and quantitative knowledge of all the forces acting on the propeller blade, but is experimentally determined. Moreover, the above described system serves for all the propellers without distinction and varies merely in dimensioning dependently upon the powers involved.

The operation of a "delta hinge" is well known. This is substantially an auxiliary axis of rotation, distinct from the hub axis X—X, about which the propeller blade can rotate for automatically adjusting its pitch to operating conditions in order to afford an optimum efficiency. In known constructions, besides the difficulty in accurately locating the hinge, a substantial error occurred, residing in the fact that the blades were bound to one another. According to this invention, each blade is free and independent of all other blades, which are likewise connected to the hub 1 in the above described manner.

Figure 6 diagrammatically shows the position of the outer race ring 10 of the bearing in a system of Cartesian axes: $x$— coinciding with the hub axis X—X; $z$— coinciding with the axis Z—Z of the sleeve 3, and $y$— perpendicular to $x$ and $z$ and determining together with the axis $z$ the "plane of the disc," perpendicular to the axis $x$.

By experiments, which shall conveniently be preceded by an approximate calculation, in the propeller according to this invention I may determine the position of the axis O—A of the bearing, that is, its directing cosines X', Y', Z', the angle $\beta$ and a range $i$ of the position of the axis R—R of the propeller blade, such that the blade is self-controlled in the range $i$. More particularly, the blade will be self-controlled if in the position $i_1$ (corresponding to the smaller angle $\varphi_1$ between R—R and the axis Z) the blade is of greater pitch and in the position $i_2$ (corresponding to the greater angle $\varphi_2$) the pitch shall be smaller, which is well known to experts.

The angle $\alpha$, comprised between the two limit positions of the propeller rake $i_1$ (maximum pitch) and $i_2$ (minimum pitch) is obviously a function of the angle $\beta$.

When it is necessary to mechanically limit the stroke of the propeller pitch the root of each blade (Figures 2 and 4) is provided with a ring 30 carrying a radial finger 31 oscillating between two stops 32, 33 carried by two rings 34, 35, respectively clamped within the outer race ring 10 of the bearing by means of the screw-threaded annular member 17. By loosening the member 17, the stops 32 and 33 may be angularly displaced. Similarly, by unscrewing the nut 27 the position of the finger 31 may be adjusted about the blade axis.

It will be understood that this construction may be varied in some details within the limits of professional knowledge of an expert in the branch and without departing from the scope of the appended claims.

What I claim is:

1. In an automatic pitch changing propeller a hub, a radial sleeve on said hub, a roller bearing having inner and outer rings, said outer ring being fixed within said sleeve, a propeller blade mounted in the inner ring of said bearing, means positioned between said outer ring and sleeve for varying the relative position between their axes, and means positioned between said inner ring and the blade for varying the relative position between the axis of said bearing and the axis of said blade.

2. In an automatic pitch changing propeller a hub, a radial sleeve on said hub, a spherical seat within said sleeve, a roller bearing having inner and outer rings, said outer ring being mounted in said seat, a propeller blade connected with the inner ring of said bearing, means associated with said outer ring and sleeve for fixing at will the position of the axis of the bearing with respect to the axis of said sleeve, and means positioned between said inner ring and the blade for varying the relative position between the axis of said bearing and the axis of said blade.

3. In an automatic pitch changing propeller a hub, a radial sleeve on said hub, a spherical seat within said sleeve, a roller bearing having an inner and outer ring, said outer ring having a spherical outline engaging said spherical seat, annular means associated with said outer ring and sleeve for fixing said outer ring in a preferred position within said seat by pivoting said ring about its center, a propeller blade rotatably adjusted in said inner ring further annular means positioned between said blade and the inner ring for fixing at will the relative position between the axis of said bearing and the axis of the blade and locking said ring in a preferred position.

4. In an automatic pitch changing propeller a hub and a blade, a radial sleeve on said hub, a spherical seat within said sleeve, a roller bearing having an inner and outer ring, said outer ring having a spherical outline engaging said spherical seat and having a circular abutment, an annular member engaging said abutment and said seat and having inclined faces for adjusting the axis of said bearing with respect to the axis of the sleeve, further spherical seat on said blade, and two sets of annular elements adjustably clamping said inner ring on said second seat.

5. A variable pitch propeller as claimed in claim 4, in which the blade root has a steel cup thereon having a peripheral abutment and an externally threaded end portion and in which said last named spherical seat, said last named annular elements and the inner ring of said bearing are clamped between said abutment and a nut screwed on said threaded portion of the cup.

6. In an automatic pitch changing propeller a hub, a radial sleeve on said hub, a spherical seat within said sleeve, a roller bearing having an inner and outer ring, said outer ring having a spherical outline engaging said spherical seat and having a circular abutment, an annular member engaging said abutment and the seat and having inclined faces for adjusting the axis of said bearing with respect to the axis of the sleeve, a propeller blade, a further spherical seat on said blade, two sets of annular elements adjustably clamping said inner ring on said second seat and regularly adjustable stop means carried by the blade and the sleeve, respectively, limiting the angle of rotation of the inner ring of the bearing about its axis.

References Cited in the file of this patent

UNITED STATES PATENTS

| Number | Name | Date |
| --- | --- | --- |
| 2,117,062 | Jablonsky | May 10, 1938 |
| 2,275,053 | Reissner et al. | Mar. 3, 1942 |
| 2,364,871 | Reissner | Dec. 12, 1944 |
| 2,370,657 | Hackenthal | Mar. 6, 1945 |
| 2,570,484 | Quinn | Oct. 9, 1951 |